United States Patent
Chow et al.

(10) Patent No.: US 7,723,923 B2
(45) Date of Patent: May 25, 2010

(54) ELECTROLUMINESCENT ELEMENT DRIVING APPARATUS

(75) Inventors: Kwok Ying Joseph Chow, Flat 9A, Block 3, Pristine Villa, Shatin, Hong Kong (CN); Tan Cheung Ngo, Flat A, 28/F, Broadview Villa, 20 Broadwood Road, Happy Valley, Hong Kong (CN); Yu Jiang, Guangdong (CN); Lin Ni, Guangxi (CN)

(73) Assignees: Kwok Ying Joseph Chow, Hong Kong (CN); Tan Cheung Ngo, Hong Kong (CN)

( * ) Notice: Subject to any disclaimer, the term of this patent is extended or adjusted under 35 U.S.C. 154(b) by 720 days.

(21) Appl. No.: 10/560,689

(22) PCT Filed: Nov. 17, 2003

(86) PCT No.: PCT/CN03/00971

§ 371 (c)(1),
(2), (4) Date: Apr. 4, 2007

(87) PCT Pub. No.: WO2005/020639

PCT Pub. Date: Mar. 3, 2005

(65) Prior Publication Data

US 2008/0284342 A1 Nov. 20, 2008

(30) Foreign Application Priority Data

Jun. 19, 2003 (CN) .............................. 03 2 72492 U

(51) Int. Cl.
*H05B 37/02* (2006.01)

(52) U.S. Cl. ..................... 315/224; 315/200 A; 315/291

(58) Field of Classification Search .............. 315/169.3, 315/200 A, 219, 224, 241 P, 241 S, 244, 291, 315/307

See application file for complete search history.

(56) References Cited

U.S. PATENT DOCUMENTS

| 5,293,098 | A | * | 3/1994 | Brownell | 315/169.3 |
|---|---|---|---|---|---|
| 5,982,105 | A | * | 11/1999 | Masters | 315/169.3 |
| 6,825,829 | B1 | * | 11/2004 | Albert et al. | 345/107 |
| 7,015,654 | B1 | * | 3/2006 | Kuhlmann et al. | 315/291 |
| 7,321,201 | B2 | * | 1/2008 | Green et al. | 315/209 R |
| 2002/0025157 | A1 | * | 2/2002 | Kawakami | 396/155 |
| 2004/0041823 | A1 | * | 3/2004 | Shin | 345/690 |

* cited by examiner

*Primary Examiner*—David Hung Vu
*Assistant Examiner*—Tung X Le
(74) *Attorney, Agent, or Firm*—Lucas & Mercanti, LLP

(57) ABSTRACT

The present utility model discloses an electroluminescent element driving apparatus, which mainly resolves the problems caused by insufficient supplying of an electric power to affect the service life of the apparatus in the prior art. The electroluminescent element driving apparatus disclosed by the present utility model includes a power supply, a controlling IC, an electroluminescent element driving unit, a electroluminescent cell comprised of an electroluminescent element, and a charging unit connected to the power supply. The power supply continually storage's electric power while it supplies the power to the controlling IC and the electroluminescent element driving unit, respectively, the controlling IC supplies a flash to at least one electroluminescent element driving unit, the electroluminescent element driving unit transmits a signal having the flash to the electroluminescent cell, and the electroluminescent cell displays the signal having the flash. Since the electroluminescent element driving means disclosed by the present utility model includes the charging unit, although the electroluminescent element will consumes much power, a battery may be charged by exterior when its electricity is lack, thereby it may be reused. Thus, the present utility model advantageously eliminates the problems of lack of the electric power and a shorting life when applied to a flashing equipment.

7 Claims, 4 Drawing Sheets

ELECTROLUMINESCENT ELEMENT DRIVING APPARATUS

FIELD OF THE UTILITY MODEL

The present utility model relates a flash driving apparatus, especially a driving apparatus using electroluminescent element as light source.

BACKGROUND OF THE UTILITY MODEL

The flashing devices are widely used on shoes, clothes or backpacks for purposes of decoration and warnings to ensure safety of the users. The working principle of electroluminescent: the fluorescent material excited by alternating current electric field emits high efficient cold light that contains no ultraviolet rays, that is, the alternating electric field generated by the alternating voltage imposed on the electrodes excites the electrons, the excited electrons knock the fluorescent material and causes the jump, change or compounding of the energy levels of the electrons which then emits high efficient cold light. The phenomenon is called electroluminescence. Electroluminescent elements are developed according to the above principle. Having a full range of colors, electroluminescent elements are widely used as LCD back light source, in clock, watch, toys, electronic giftware, Christmas lights, advertisement signs, emergency marker lights, door signs and plates, vehicle license plates, instruments and meters and night lights and so forth.

A flash driving device of the existing technology is shown in FIG. 1, which is composed of power supply, controlling IC, electroluminescent element driving unit, and electroluminescent element. The power supply feed the controlling IC and the electroluminescent element driving unit, the controlling IC supplies a flash to electroluminescent element driving unit which in turn drives the cell to display flash according to the signals of controlling IC.

The physical luminescence of the electroluminescent element requires alternating (AC) voltage as its working voltage, the optimum range of which under current technical standards is from 50V to 110V, with the frequency range from 400 Hz to 1200 Hz. This imposes a high demand on the DC power supply which needs to be converted to AC voltage to drive the electroluminescent element. Most flash devices use batteries as power supply due to limited installation spaces on the articles like shoes and clothes and the limited weight of the device themselves. When DC 3-6V is raised to AC50-110V, there exists the problem of the conversion efficiency which prevents the unchargeable batteries from having a satisfactory service life, thus the application of the colorful electroluminescent elements in the flash devices failed to reach its ideal potential.

SUMMARY OF UTILITY MODEL

The purpose of the utility model is to provide an electroluminescent element driving apparatus that is able to supply sufficient power to the electroluminescent element to ensure a prolonged service life.

The electroluminescent element driving apparatus disclosed by the present utility model includes a power supply, a controlling IC, an electroluminescent element driving unit, an electroluminescent cell comprised of an electroluminescent element, and a charging unit connected to the power supply. The power supply continually stores electric power while it supplies the power to the controlling IC and the electroluminescent element driving unit respectively, the controlling IC supplies a flash to at least one electroluminescent element driving unit, the electroluminescent element driving unit transmits a signal having the flash to the electroluminescent cell, and the electroluminescent cell displays the signal having the flash.

Since the electroluminescent element driving apparatus disclosed by the present utility model includes the charging unit, although the electroluminescent element will consumes much power, a battery may be charged by exterior power when its electricity is lack, thereby it may be reused. Thus, the present utility model advantageously eliminates the problems of lack of the electric power and a short life when applied to flashing equipment.

DETAILED DESCRIPTION OF THE PREFERRED EMBODIMENTS

Figure 1:
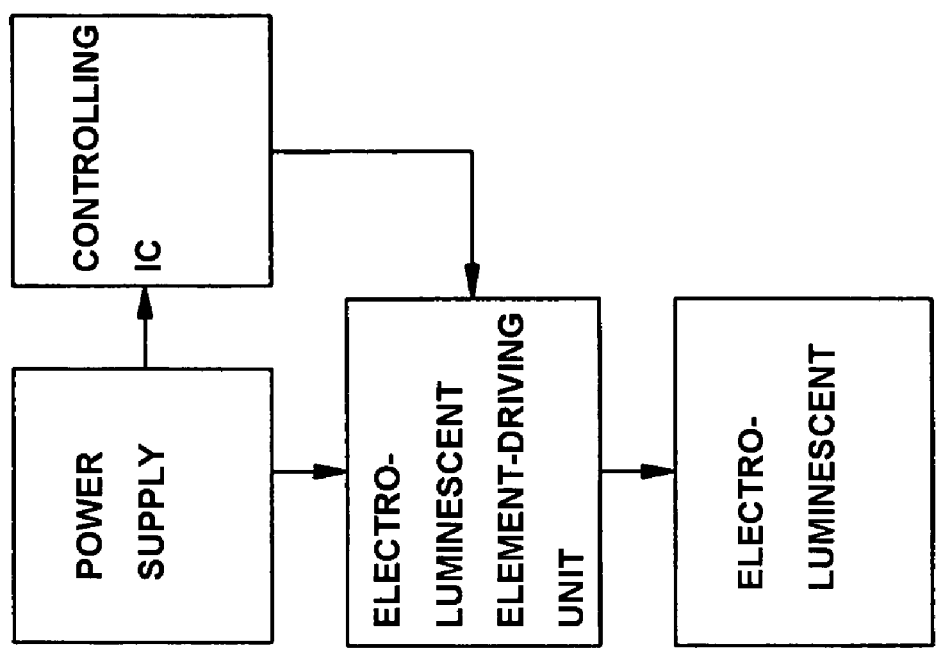
FIG. 1 is block schematic diagram of existing technology.
Figure 2:
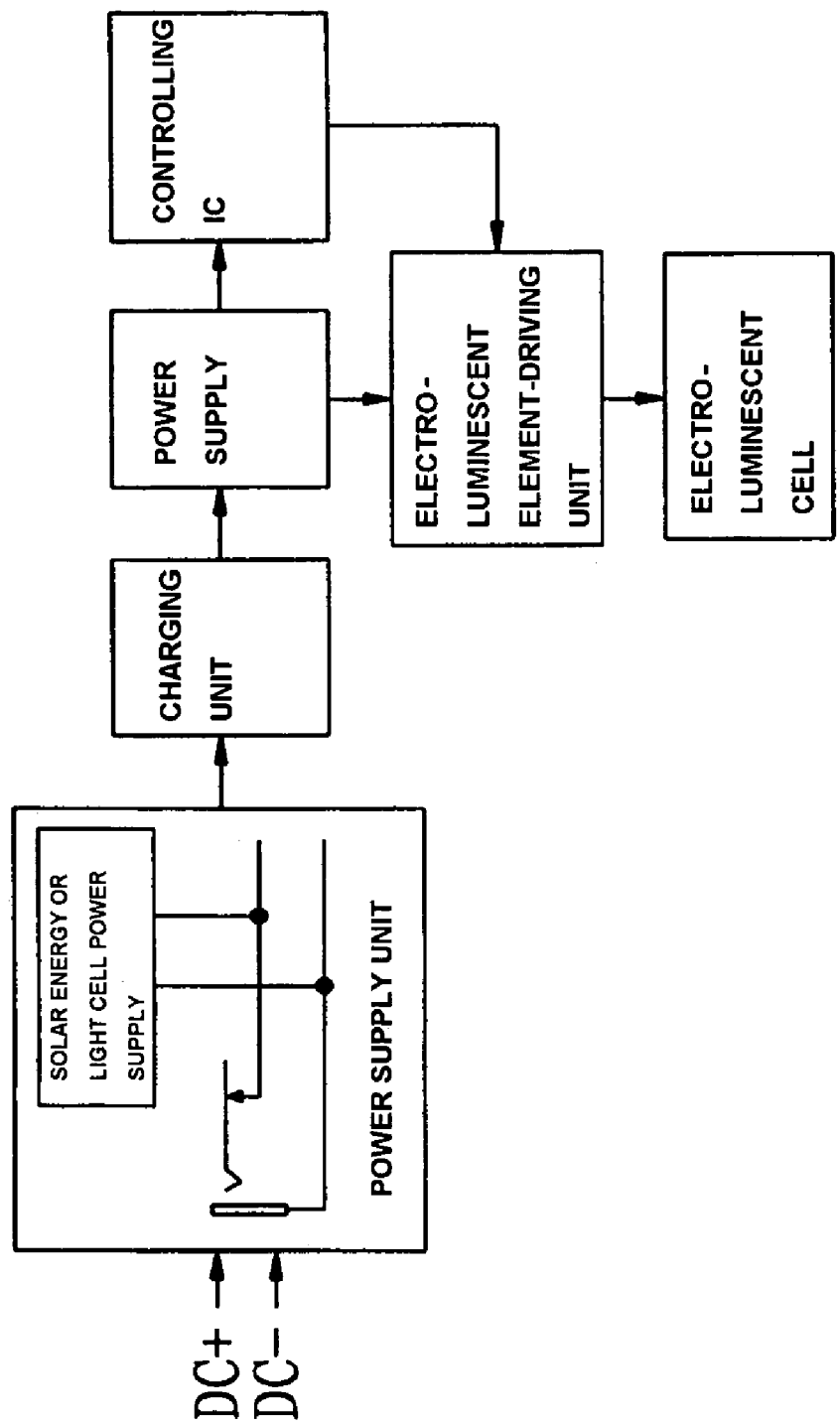
FIG. 2 is schematic diagram of the present utility model.
Figure 3:
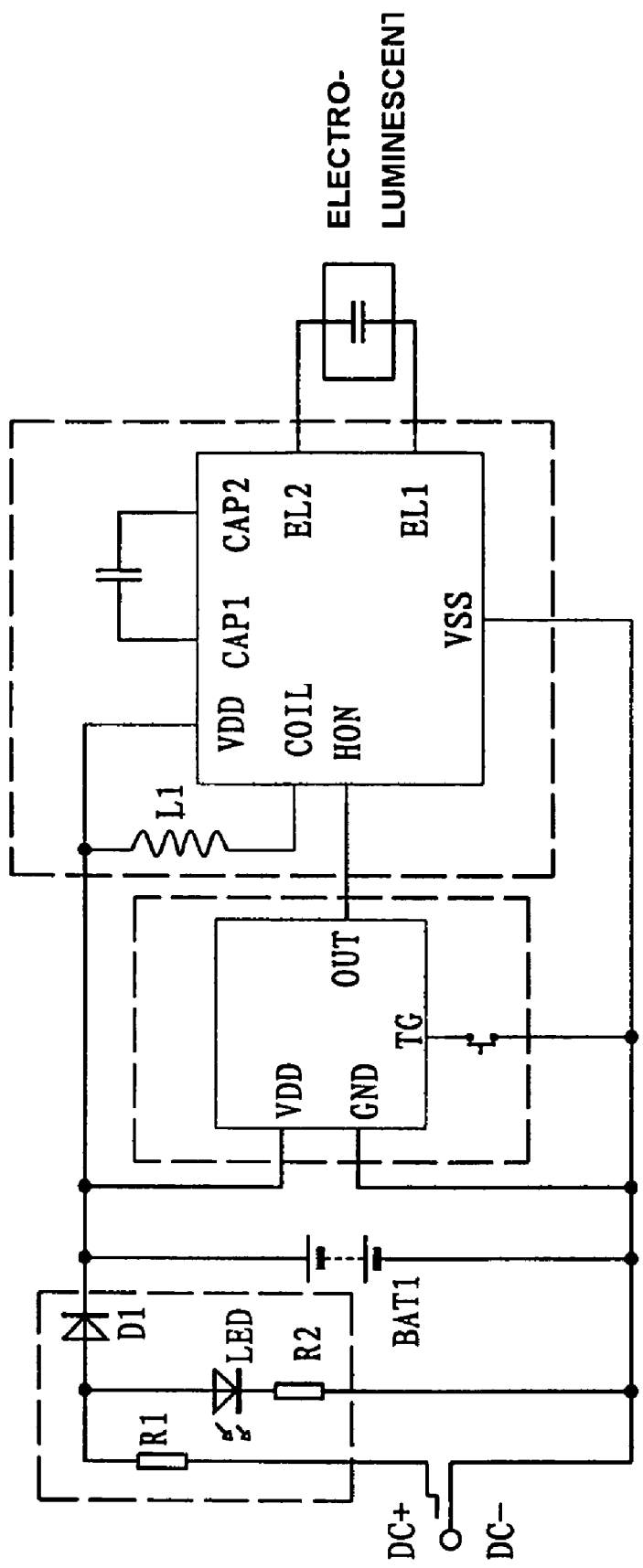
FIG. 3 is schematic diagram of an embodiment of the present utility model.

The luminescent element driving apparatus for shoes disclosed in this utility model, as illustrated in FIG. 2, 3, includes a power supply, a controlling IC, an electroluminescent element-driving unit, an electroluminescent cell comprised of an electroluminescent element, a charging unit connected to the power supply, and a power-supplying unit connected to the charging unit. The power supplying unit supplies power to the power supply through the charging unit, and the power supply continually stores electric power while it supplies the power to the controlling IC and the electroluminescent element driving unit respectively, the controlling IC supplies a flash to at least one electroluminescent element driving unit, the electroluminescent element driving unit transmits a signal having the flash to the electroluminescent cell, and the electroluminescent cell displays the signal having the flash.

The above stated charging unit has exterior interface DC+ and DC− pins, the DC+pin is connected to the resistor R1 which is connected to the positive electrode of the diode D1, while the negative electrode of the diode D1 is connected to the positive electrode of the power supply BAT1; the DC− pin is connected to the negative electrode of the power supply; the diode D1 prevents the power supply BAT1 from discharging to the charging unit; between the current limiting resistor R1 and the power supply BAT1 there is a luminescent diode LED indicating the charging status, the positive electrode of the LED is connected to the positive electrode of the power supply through the resistor R1, its negative electrode is connected to the negative electrode of the power supply through a current limiting resistor R2; the positive electrode of BAT1 is connected respectively to the positive pin VDD of the controlling IC and the positive pin VDD of the electroluminescent element driving unit, while the negative electrode of BAT1 is connected respectively to the ground pin GND of the controlling IC and the negative pin VSS of the electroluminescent element driving unit; the output end OUT of the controlling IC is connected to the light control end HON of the electroluminescent element driving unit, between the trigging pin TG end of the controlling IC and the ground is connected with a trigger switch which can be an elastic one, between the inductance incoming end COIL of the electroluminescent element driving unit and the positive electrode of BAT1 is connected with an inductor L1; a capacitor is connected between the incoming capacitor pins CAP1 and CAP2 of the of the electroluminescent element driving unit; the output pins EL1 and EL2 of the electroluminescent element driving unit are connected to the two electrodes of the electroluminescent element respectively.

Figure 4:
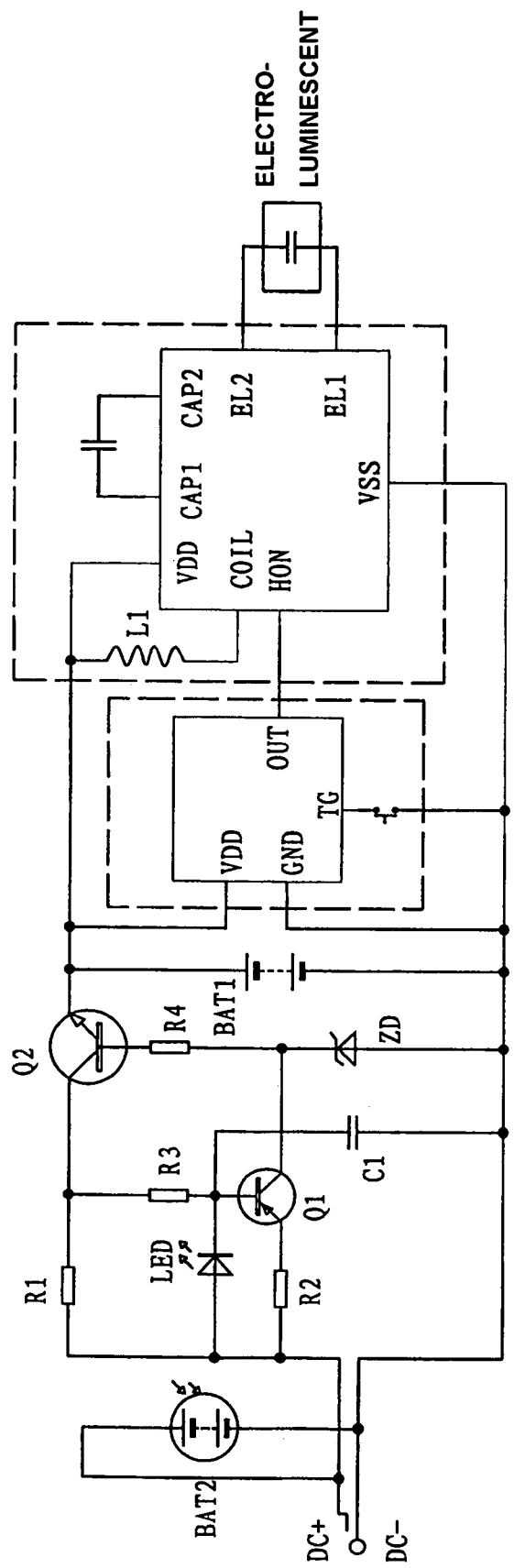
FIG. 4 is schematic diagram of another embodiment of the present utility model.

The charging unit in another embodiment is shown in FIG. 4, a solar energy power supply unit can be paralleled between the DC+ and DC− pins of the charging unit, the positive electrode of the solar power supply BAT2 is connected to DC+, its negative electrode is connected to DC−; the charging unit charges BAT1 with solar energy, light cell can also be used as power supply unit.

The charging unit is composed of the resistances R1,R2, R3,R4, a PNP triode Q1, a NPN triode Q2, a luminescent diode LED, a capacitor C1 and a Zener diode ZD; the current limiting resistor R2, luminescent diode LED, PNP triode Q1 and the Zener diode constitute a constant current circuit, DC+ is connected to the emitter of the triode Q1 through current limited resistor R2, DC+ is connected to the positive electrode of the LED; the negative electrode of the LED is connected to the base of the triode Q1, the collector of the triode Q1 is connected to the negative electrode of ZD; the negative electrode of the LED is connected to a capacitor which is connected to the negative electrode of power supply BAT1, constituting the charging circuit; a current limiting resistor R3 is connected between the base of triode Q1 and the collector of triode Q2, which constitutes current passage through Q1; DC+ is connected to the collector of Q2 through the current limiting resistor R1, the emitter of. Q2 is connected to the positive electrode of the power supply BAT1, which constitutes a charging loop; a current limiting resistor R4 is connected to the base of triode Q2 and the negative electrode of Zener diode ZD, the positive electrode of Zener diode ZD is connected to the negative electrode of power supply BAT1, which constitutes the voltage comparison circuit; the positive electrode of power supply BAT1 is connected respectively to the positive pin VDD of the controlling IC and the positive pin VDD of the electroluminescent element driving unit, while the negative electrode of BAT1 is connected respectively to the ground pin GND of the controlling IC and the negative pin VSS of the electroluminescent element driving unit; the output end OUT of the controlling IC is connected to the light control end HON of the electroluminescent element driving unit, between the trigging pin TG end of the controlling IC and the ground is connected with a trigger switch which can be an elastic one, between the inductance incoming end COIL of the electroluminescent element driving unit and the positive electrode of BAT1 is connected with an inductor L1; a capacitor is connected between the incoming capacitor pins CAP1 and CAP2 of the of the electroluminescent element driving unit; the output pins EL1 and EL2 of the electroluminescent element driving unit are connected to the two electrodes of the electroluminescent element respectively.

The said luminescent unit and the electroluminescent element-driving unit can be connected with a connector.

The present utility model is not limited to the above stated embodiments; any equivalent substitution of the above specific structures will be fallen into the scope of the technical scheme of this document.

What is claimed is:

1. An electroluminescent element driving apparatus including a power supply, a controlling IC, an electroluminescent element driving unit, an electroluminescent cell comprised of an electroluminescent element is characterized by that the power supply is connected with a charging unit which supplies power to the power supply, the power supply continually stores electric power while it supplies the power to the controlling IC and the electroluminescent element driving unit, respectively, the controlling IC supplies a flash to at least one electroluminescent element driving unit, the electroluminescent element driving unit transmits a signal having the flash to the electroluminescent cell, and the electroluminescent cell displays the signal having the flash, wherein said charging unit has exterior interface and pins, (DC+, DC−) the positive interface pin is connected to a resistor (R1) which is connected to the positive electrode of a diode (D1), while the negative electrode of the diode (D1) is connected to the positive electrode of the power supply (BAT1) and the negative interface pin is connected to the negative electrode of the power supply; and wherein between the resistor (R1) and the negative interface pin (DC−) are connected with a luminescent diode (LED) and the resistor (R2), between the negative electrode of the luminescent limiting resistor (R2), and the negative interface pin (DC−) is connected to the negative electrode of power supply (BAT1).

2. A electroluminescent element driving apparatus according to claim 1, characterized by that the said charging unit is connected with a power supplying unit.

3. A electroluminescent element driving apparatus according to claim 1, characterized by that a solar energy power supply unit can be paralleled between the exterior interface pins (DC+, DC−) of the said charging unit, the positive electrode of the solar power supply (BAT2) is connected to the positive interface pin (DC+), its negative electrode is connected to the negative interface pin (DC−);

the charging unit charges power supply (BAT1) with solar energy.

4. A electroluminescent element driving apparatus according to claim 3, characterized by that the solar energy power supply unit can be composed by a series of solar cells.

5. A An electroluminescent element driving apparatus according to claim 1, characterized by that the luminescent element can be connected to the electroluminescent unit with a connector.

6. An electroluminescent element driving apparatus including a power supply, a controlling IC, an electroluminescent element driving unit, an electroluminescent cell comprised of an electroluminescent element is characterized by that the power supply is connected with a charging unit which supplies power to the power supply, the power supply continually stores electric power while it supplies the power to the controlling IC and the electroluminescent element driving unit, respectively, the controlling IC supplies a flash to at least one electroluminescent element driving unit, the electroluminescent element driving unit transmits a signal having the flash to the electroluminescent cell, and the electroluminescent cell displays the signal having the flash, said charging unit has exterior interface pins (DC+, DC−), it is composed of resistors (R1,R2,R3,R4), a PNP triode (Q1), a NPN triode (Q2), a luminescent diode (LED), a capacitor (C1) and a Zener diode (ZD);

one of the resistors (R2), the luminescent diode (LED), the PNP triode (Q1) and the Zener diode constituting a constant current circuit, the positive interface pin (DC+) is connected to the emitter of the triode (Q1) through a resistor (R2), the positive interface pin (DC+) is connected to the positive electrode of the luminescent diode (LED);

the negative electrode of the luminescent diode (LED) is connected to the base of the triode (Q1), the collector of the triode (Q1) is connected to the negative electrode of the Zener diode (ZD);

the negative electrode of the luminescent diode (LED) is connected to a capacitor which is connected to the negative electrode of power supply (BAT1), constituting the charging starting circuit;

a current limiting resistor (R3) is connected between the base of PNP triode (Q1) and the collector of NPN triode (Q2), which constitutes current passage through the PNP triode (Q1);

the positive interface pin (DC+) is connected to the collector of NPN triode (Q2) through the current limiting resistor (R1), the emitter of NPN triode (Q2) is connected to the positive electrode of the power supply (BAT1), which constitutes a charging loop;

a current limiting resistor (R4) is connected to the base of NPN triode (Q2) and the negative electrode of Zener diode (ZD), the positive electrode of Zener diode (ZD) is connected to the negative electrode of power supply (BAT1), which constitutes the voltage comparison circuit.

7. An electroluminescent element driving apparatus including a power supply, a controlling IC, an electroluminescent element driving unit, an electroluminescent cell comprised of an electroluminescent element is characterized by that the power supply is connected with a charging unit which supplies power to the power supply, the power supply continually stores electric power while it supplies the power to the controlling IC and the electroluminescent element driving unit, respectively, the controlling IC supplies a flash to at least one electroluminescent element driving unit, the electroluminescent element driving unit transmits a signal having the flash to the electroluminescent cell, and the electroluminescent cell displays the signal having the flash, said charging unit has exterior interface and pins, the positive interface pin is connected to a resistor (R1) which is connected to the positive electrode of a diode (D1), while the negative electrode of the diode (D1) is connected to the positive electrode of the power supply (BAT1) and the negative interface pin is connected to the negative electrode of the power supply;

the positive electrode of power supply (BAT1) is connected respectively to the positive pin (VDD) of the controlling IC and the positive pin (VDD) of the electroluminescent element driving unit, while the negative electrode of the power supply (BAT1) is connected respectively to the ground pin (GND) of the controlling IC and the negative pin (VSS) of the electroluminescent element diving unit;

the output end (OUT) of the controlling IC is connected to the light control end (HON) of the electroluminescent element driving unit, between the trigging pin (TG) end of the controlling IC and the ground is connected with a trigger switch, between the inductance incoming end (COIL) of the electroluminescent element driving unit and the positive electrode of power supply (BAT1) is connected with an inductor (L1);

a capacitor is connected between the incoming capacitor pins (CAP1) and (CAP2) of the electroluminescent element driving unit;

the output pins (EL1) and (EL2) of the electroluminescent element driving unit are connected to the two electrodes of the electroluminescent element respectively.

* * * * *